United States Patent
Riggert et al.

(10) Patent No.: US 11,497,223 B2
(45) Date of Patent: Nov. 15, 2022

(54) CONVEYING DEVICE AND METHOD FOR CONVEYING POULTRY BODIES, AND APPARATUS AND METHOD FOR RECOVERING FILLETS FROM POULTRY BODIES

(71) Applicant: NORDISCHER MASCHINENBAU RUD. BAADER GMBH + CO. KG, Lübeck (DE)

(72) Inventors: Lasse Riggert, Lübeck (DE); Adrian Schulze, Lübeck (DE); Matthias Schröder, Stockelsdorf (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 382 days.

(21) Appl. No.: 16/627,005

(22) PCT Filed: Jun. 30, 2017

(86) PCT No.: PCT/EP2017/066276
§ 371 (c)(1),
(2) Date: Dec. 27, 2019

(87) PCT Pub. No.: WO2019/001728
PCT Pub. Date: Jan. 3, 2019

(65) Prior Publication Data
US 2020/0138049 A1 May 7, 2020

(51) Int. Cl.
*A22C 21/00* (2006.01)
(52) U.S. Cl.
CPC ...... *A22C 21/0053* (2013.01); *A22C 21/0092* (2013.01)
(58) Field of Classification Search
CPC . A22C 21/0053; A22C 21/0092; A22B 7/001; A22B 7/003
(Continued)

(56) References Cited

U.S. PATENT DOCUMENTS 5,205,779 A * 4/1993 O'Brien ............... A22B 5/0005
452/155
5,312,291 A 5/1994 Van Den Nieuwelaar et al.
(Continued)

FOREIGN PATENT DOCUMENTS

CN 1028221611 12/2012
CN 106063501 11/2016
(Continued)

OTHER PUBLICATIONS

Second China Search Report/Office Action conducted in China Appln. No. 201780092355 (dated Sep. 1, 2021) (w/ translation).
(Continued)

*Primary Examiner* — Richard T Price, Jr.
(74) *Attorney, Agent, or Firm* — Greenblum & Bernstein, P.L.C.

(57) ABSTRACT

A conveying device, apparatus and method for continuously conveying poultry bodies or parts oriented into different processing positions in a conveying direction. A continuous conveyor, which is provided with receiving elements for holding the poultry bodies revolves in a conveying plane and forms a conveying path. The receiving elements each of which include a saddle element to receive one of the poultry bodies, are arranged on a base element to be pivotable about an axis of rotation lying perpendicular to the conveying direction. The conveying plane is arranged inclined relative to the horizontal by an angle of inclination α greater than 0° and less than 90°, and the base elements are each arranged on the continuous conveyor by angled elements with an angle of extension β less than 180° and greater than 90°.

21 Claims, 5 Drawing Sheets

Figure 1:
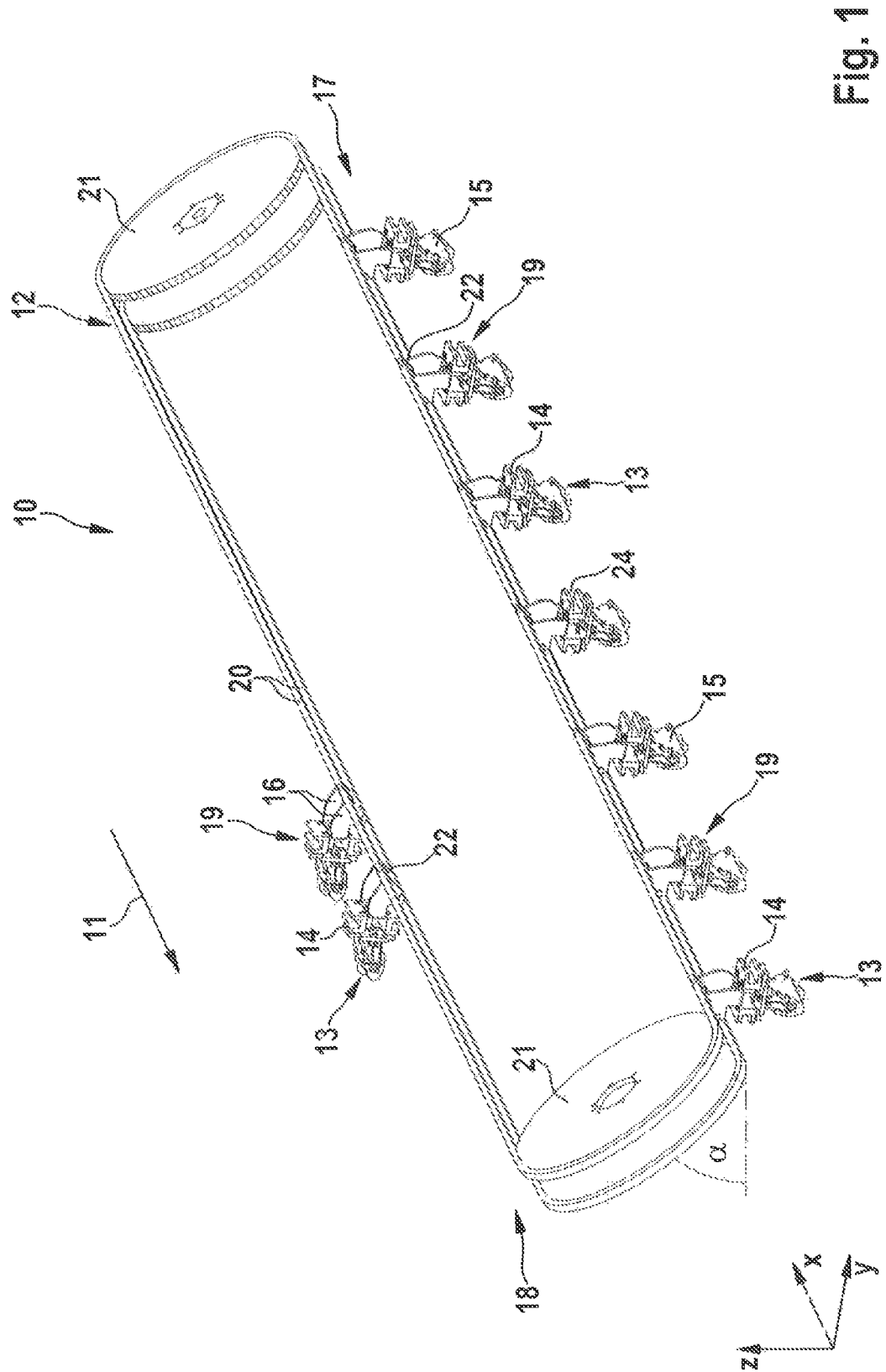

(58) Field of Classification Search
USPC .................................. 452/53, 185, 177–180
See application file for complete search history.

(56) References Cited

U.S. PATENT DOCUMENTS

| | | | |
|---|---|---|---|
| 5,372,539 | A | 12/1994 | Kunig et al. |
| 5,954,393 | A * | 9/1999 | Perrin .................... A47C 7/70 |
| | | | 297/161 |
| 6,082,077 | A | 7/2000 | Christ |
| 6,764,393 | B1 | 7/2004 | Hazenbroek et al. |
| 6,986,707 | B2 * | 1/2006 | Van Den Nieuwelaar ................ |
| | | | A22C 21/0023 |
| | | | 452/187 |
| 7,232,365 | B2 * | 6/2007 | Annema ............ A22C 21/0076 |
| | | | 452/167 |
| 2012/0011808 | A1 | 1/2012 | Langen et al. |
| 2012/0315834 | A1 | 12/2012 | Van Der Steen et al. |
| 2013/0052924 | A1 | 2/2013 | Kjeldsen et al. |
| 2017/0079291 | A1 | 3/2017 | Van Mil et al. |

FOREIGN PATENT DOCUMENTS

| | | |
|---|---|---|
| CN | 106857772 | 6/2017 |
| DE | 42 34 040 | 4/1994 |
| EP | 0 551 156 | 7/1993 |
| EP | 0 875 459 | 11/1998 |
| JP | 06-007074 | 1/1994 |
| JP | 10-310101 | 11/1998 |
| JP | 2017-513464 | 6/2017 |

OTHER PUBLICATIONS

China Search Report/Office Action conducted in China Appln. No. 201780092355 (dated Mar. 26, 2021) (w/ translation).
Korea Grant of Patent (OA) conducted in Korea Appln. No. KR20197038774 (dated Apr. 12, 2022) (w/ translation).
Int'l Search Report (Form PCT/ISA/210) conducted in Int'l Appln. No. PCT/EP2017/066276 (dated Mar. 23, 2018).
Int'l Written Opinion (Form PCT/ISA/237) conducted in Int'l Appln. No. PCT/EP2017/066276 (dated Mar. 23, 2018).

* cited by examiner

CONVEYING DEVICE AND METHOD FOR CONVEYING POULTRY BODIES, AND APPARATUS AND METHOD FOR RECOVERING FILLETS FROM POULTRY BODIES

The present invention relates to a conveying device for continuously conveying poultry bodies in a conveying direction, configured and adapted to orient the poultry bodies into different processing positions, comprising a continuous conveyor provided with receiving elements for holding the poultry bodies, wherein the continuous conveyor is adapted to revolve in a conveying plane and forms a conveying path, and wherein the receiving elements each comprise a saddle element adapted to receive one of the poultry bodies and arranged on a base element to be pivotable about an axis of rotation lying perpendicular to the conveying direction.

The invention relates further to a method for continuously conveying poultry bodies and for orienting them into different processing positions, comprising conveying the poultry bodies in a conveying direction by means of a continuous conveyor provided with receiving elements for holding the poultry bodies, wherein the continuous conveyor forms a conveying path and revolves in a conveying plane, and wherein the receiving elements each comprise a saddle element adapted to receive one of the poultry bodies and arranged on the base element to be pivotable about an axis of rotation lying perpendicular to the conveying direction.

The present invention relates also to an apparatus for recovering fillets from poultry bodies or parts thereof, and to a corresponding method.

Such conveying devices, methods for continuously conveying, apparatuses and methods for recovering fillets are used in the fully or semi-automatic processing of poultry bodies or parts of poultry bodies. Such a method for mechanically recovering the meat from poultry bodies and a device for carrying out such a method are known, for example, from document DE 42 34 040 A1 from the applicants company.

The poultry bodies to be processed consist of breast caps. The breast caps are part of a front-half, which is obtained by dividing a poultry body in the middle. Such breast caps are obtained, for example, by means of a diagonal cut through the front-half. Such a breast cap therefore essentially comprises parts of the ribcage with the ribs, the breastbone and the wishbone with the wing joints at the free ends. Attached thereto are on the one hand the wishbone and on the other hand the shoulder blades. The poultry bodies, or breast caps, are held by means of receivers and conveyed in the direction of their longitudinal axis with the wing joints forward. Various tools are arranged along the transport path, by means of which processing of the poultry bodies takes place sequentially.

It is a disadvantage that the receivers for the poultry bodies or the parts thereof are conveyed with a fixed orientation. In order to be able to carry out the desired processing steps on the poultry body or the poultry parts by means of the respective processing tools, high demands are made in respect of the movability of the tools. The tools must, as it were, work around the poultry bodies. To that end, the tools must be equipped with correspondingly many degrees of freedom, which results in a high outlay in terms of construction and correspondingly high tool costs.

Accordingly, it is an object of the present invention to propose a conveying device for continuously conveying poultry bodies or parts thereof which allows the poultry bodies or the poultry parts to be oriented into different processing positions during the conveying operation.

The object further consists in proposing a corresponding apparatus for recovering fillets from poultry bodies or parts thereof. In addition, the object consists in proposing corresponding methods for continuously conveying poultry bodies or parts thereof.

The object is achieved by a conveying device having the features mentioned hereinbefore in that the continuous conveyor is so arranged in an oblique position that the conveying plane is inclined relative to the horizontal by an angle of inclination $\alpha$ greater than 0° and less than 90°, and the base elements are each arranged on the continuous conveyor by means of angled elements with an angle of extension $\beta$ less than 180° and greater than 90°.

This offers the advantage that the orientation of the saddle elements can be changed during a revolution of the continuous conveyor. In this manner, automatic orientation of the poultry bodies or the poultry parts takes place as the conveyor revolves. By means of the conveying device according to the invention it is therefore possible for the first time to orient the poultry bodies or the poultry parts into a plurality of different processing positions during the conveying operation. The required processing steps on the poultry bodies or the parts thereof can then be carried out at those points of the conveying path at which the saddle elements are oriented in the optimal position for processing purposes.

The conveying device according to the invention thus ensures optimal orientation of the poultry bodies or the poultry parts, so that the processing steps can be carried out on the one hand with high precision and on the other hand by means of processing tools which have comparatively low tool complexity in respect of their spatial movability.

An expedient embodiment of the invention is characterised in that the angle size of the angle of extension $\beta$ corresponds to the difference of 180° and the angle of inclination $\alpha$. In other words, the oblique position of the conveying plane of the continuous conveyor by the angle of inclination $\alpha$ is offset by the angle of extension $\beta$ of the angled elements, namely in such a manner that the inclination of the continuous conveyor is compensated at least substantially by the angled elements with the angle of extension $\beta$. This means that the axes of rotation of the saddle elements are advantageously oriented horizontally or vertically in a portion of the conveying path.

A further preferred development of the invention is distinguished by the fact that the angle of extension $\beta$ has an angle size of 135° and the angle of inclination $\alpha$ has an angle size of 45°. The choice of the above-mentioned angle sizes offers the advantage that the axes of rotation of the saddle elements are oriented parallel to the horizontal in one portion of the conveying path, while in another portion of the conveying path the axes of rotation of the saddle elements are oriented vertically. As a result of the oblique position of the conveying device, a lower section of the conveying path and an upper section of the conveying path are obtained. Preferably, the axes of rotation in the upper section are thus oriented parallel to the horizontal, while the axes of rotation in the lower section are oriented parallel to the vertical.

A further advantage is that, in the region of the lower section, the poultry bodies or the parts thereof are conveyed by means of the saddle elements in such a manner that they are conveyed while being held from the top, that is to say while hanging downwards. This offers the advantage that parts which have been separated or already loosened by means of the processing tools fall or hang freely downwards due to gravity, so that the processing region is free of the mentioned parts and thus accessible for the intervention of further tools.

A further expedient embodiment of the invention is characterised in that the angle of extension β of the angled elements is in each case adapted to be adjustable. As great a degree of flexibility as possible of the conveying device according to the invention is thus achieved. By changing the angle of extension β of the angled elements, the orientation of the saddle elements, or the different orientations of the saddle elements obtained at each revolution, can optimally be adapted to the particular circumstances.

To that end, the angled elements have, for example, an adjusting mechanism by means of which the angle size of the angle of extension β can be preset. It is also possible to equip the angled elements with actuators so that adjustment of the angles of extension is optionally made possible during ongoing operation.

An expedient embodiment of the invention provides that the continuous conveyor comprises two conveying chains arranged parallel to one another, each of which is guided via at least two double sprockets. In this manner, precise guiding of the saddle elements connected in each case via the base element to the conveying chains is achieved. By means of the two conveying chains, the base element in question is held precisely.

According to a further preferred embodiment of the invention, it is provided that the angled elements are arranged on holding devices which in each case are arranged on both of the conveying chains. By connecting the angled elements via the holding device with in each case both of the conveying chains, a particularly rigid connection between the conveying chains and the angled elements is achieved, so that the orientation of the receiving elements is maintained exactly even when subjected to external forces which act, for example, by means of the processing tools via the poultry bodies.

A further expedient embodiment of the invention is characterised in that the holding devices are each in plate form, and each of the base elements is connected via two each of the angled elements to one of the holding devices. In each case one of the holding devices, one of the base elements and two each of the angled elements, which in each case connects the holding device to the base element, form a particularly rigid unit which permits correspondingly precise spatial orientation.

A preferred further development of the invention is distinguished by the fact that the base elements each comprise guides, and guiding means adapted for engagement into the guides are located at least in part-regions along the conveying path. This offers the advantage that the saddle elements are additionally guided via the base elements in the mentioned part-regions along the conveying path. In this manner, the precise orientation of the saddle elements is always ensured even under the action of external forces, for example during the operation of processing the poultry bodies or the parts thereof. The guides of the base elements as well as the guiding means arranged in part-regions along the conveying path are preferably in the form of linear guides.

A preferred embodiment of the invention is distinguished by the fact that adjusting means are arranged on the saddle elements, which adjusting means are adapted, in conjunction with control means arranged along the conveying path, to pivot the saddle elements about the axis of rotation. This offers the further advantage that, as well as the automatic change in the orientation of the saddle elements during a revolution, the saddle elements are additionally pivoted about the mentioned axis of rotation. Accordingly, the present invention makes it possible on the one hand to orient the axis of rotation of the saddle elements differently during a revolution of the continuous conveyor and at the same time to pivot the saddle elements about that axis of rotation. In this manner, particularly high flexibility in terms of the spatial orientation of the poultry bodies or parts thereof is achieved.

Further preferably, the adjusting means and the control means are each in the form of a cam control which is adapted to pivot the saddle elements about the axis of rotation in each case in 90° steps. Advantageously, the saddle elements, or the conveyed poultry bodies or poultry parts, are thus automatically pivoted into the optimal processing position in 90° steps by the control means arranged along the conveying path. The cam control on the adjusting means side is preferably in the form of a Maltese cross, into the recesses of which there engage the control means, for example, in the form of round bars.

The object is further achieved by the apparatus mentioned hereinbefore for recovering fillets from poultry bodies or parts thereof, wherein this apparatus comprises a conveying device having the features mentioned above as well as at least one mounting station arranged along the conveying path and adapted for loading the poultry bodies onto the receiving elements, skinning tools and also fillet loosening tools, a removal station for completely removing the fillets from the poultry carcass, and a discharge station for removing the fillet-free poultry carcass from the respective receiving element, wherein the mounting station, the discharge station and the removal station are arranged in an upper region of the conveying path, while the skinning tools and the fillet loosening tools are arranged in a lower region of the conveying path. In this manner, the respective processing steps are carried out by means of the mentioned processing station at positions of the conveying path at which the saddle elements are optimally oriented for that processing.

An advantageous further development of the invention provides that the apparatus according to the invention further comprises at least one measuring means adapted for determining the shoulder joint position, and also a control device which is configured to control the fillet loosening tools in dependence on the determined shoulder joint position. The at least one measuring means serves to detect the position of the shoulder joints. On this basis of this determined position, actuation of the fillet loosening tools is effected by means of the control device. The detected shoulder joint position thus serves as a reference for coordinating the triggering in time of the fillet loosening tools. In this manner, the fillets are loosened precisely.

The object is also achieved by a corresponding method for continuously conveying poultry bodies or parts thereof and for orienting them into different processing positions, in that the continuous conveyor revolves in a conveying plane which is inclined relative to the horizontal by an angle of inclination α greater than 0° and less than 90°, and the base elements are each arranged on the continuous conveyor by means of angled elements with an angle of extension β less than 180° and greater than 90°. As a result of the oblique position of the conveying plane and the base elements arranged by means of the angled elements at the mentioned angle of extension β, the orientation of the saddle elements changes automatically during a revolution of the continuous conveyor. Accordingly, in a surprisingly simple manner, an automatic change in orientation of the base elements, and thus of the saddle elements, is achieved, in order to bring the poultry bodies or parts thereof into the optimal position for processing. An expensive mechanism for changing the orientation of the saddle elements which would otherwise be required can be omitted thanks to the present invention.

According to a further advantageous embodiment of the invention, it is provided that the angle size of the angle of extension β corresponds to the difference of 180° and the angle of inclination α. The mentioned dimensioning of the angle sizes has the effect that the oblique position, or inclination, of the conveying plane and the angular position of the angled elements leads to a change in the orientation of the base elements and of the saddle elements.

According to a further advantageous embodiment, the angle of extension β has an angle size of 135° and the angle of inclination α has an angle size of 45°. The choice of these angle sizes is found to be particularly advantageous because the orientation of the axis of rotation thus changes cyclically on each revolution from the horizontal to the vertical and vice versa. The vertical and horizontal orientation of the axis of rotation is in each case particularly advantageous for carrying out specific processing steps.

According to a further preferred embodiment, the angle of extension β of each of the angled elements is adjustable. This offers the advantage that the orientation of the base elements and of the saddle elements can be optimally adapted to the desired intended use. To that end, the angled elements preferably comprise setting means by means of which the size of the angle of extension β can be preset or dynamically adapted during ongoing operation of the conveying device.

In a further advantageous embodiment of the invention, the base elements are guided by means of guides into which there engage guiding means arranged at least in part-regions along the conveying path. Additional guiding of the base elements is thereby achieved, so that it is always maintained, even when acted on by external force, for example by processing tools arranged on the conveying path.

In an advantageous further development of the invention, the saddle elements are pivoted about the axis of rotation by means of adjusting means arranged on the saddle elements by cooperation with control means arranged along the conveying path. Advantageously, the poultry bodies or parts thereof are thus brought into the desired orientation for the carrying out of processing steps. In addition to the change in orientation which already takes place during a revolution as a result of the oblique position of the conveying plane and the arrangement of the base elements by means of the angled elements, pivoting about the axis of rotation represents an additional possibility of bringing the saddle elements with the poultry bodies or parts thereof into an optimal processing position.

An advantageous embodiment of the invention is distinguished by the fact that the saddle elements are pivoted stepwise in 90° steps by means of the adjusting means each in the form of a cam control. In this manner, a kind of locking function is achieved, so that the saddle elements are pivotable about the axis of rotation but automatically remain in defined end positions following the pivoting movement.

Finally, the object is also achieved by a method for recovering fillets from poultry bodies or parts thereof, comprising a method for continuously conveying poultry bodies and for orienting them into different processing positions having the method features mentioned above and the following further steps: loading the poultry bodies onto the receiving elements at a mounting station, skinning the poultry bodies by means of skinning tools, loosening the fillets by means of fillet loosening tools, completely removing the fillets from the poultry carcass at a removal station, and removing the fillet-free poultry carcass from the receiving element by means of a discharge station, wherein loading by means of the mounting station, removal of the fillet-free poultry carcass by means of the discharge station and complete removal of the fillets by means of the removal station take place in an upper region of the conveying path, while skinning by means of the skinning tools and loosening of the fillets by means of the fillet loosening tools are carried out in a lower region of the conveying path.

Advantageously, it is further provided to determine the shoulder joint position by means of at least one measuring means and to control the fillet loosening tools by means of a control device in dependence on the determined shoulder joint position.

In order to avoid repetition, reference may additionally be made in connection with the advantages arising from the methods according to the invention to the above observations relating to the conveying device according to the invention and to the apparatus according to the invention for recovering fillets. The advantageous details mentioned there also apply analogously to the methods according to the invention described above.

Figure 2:
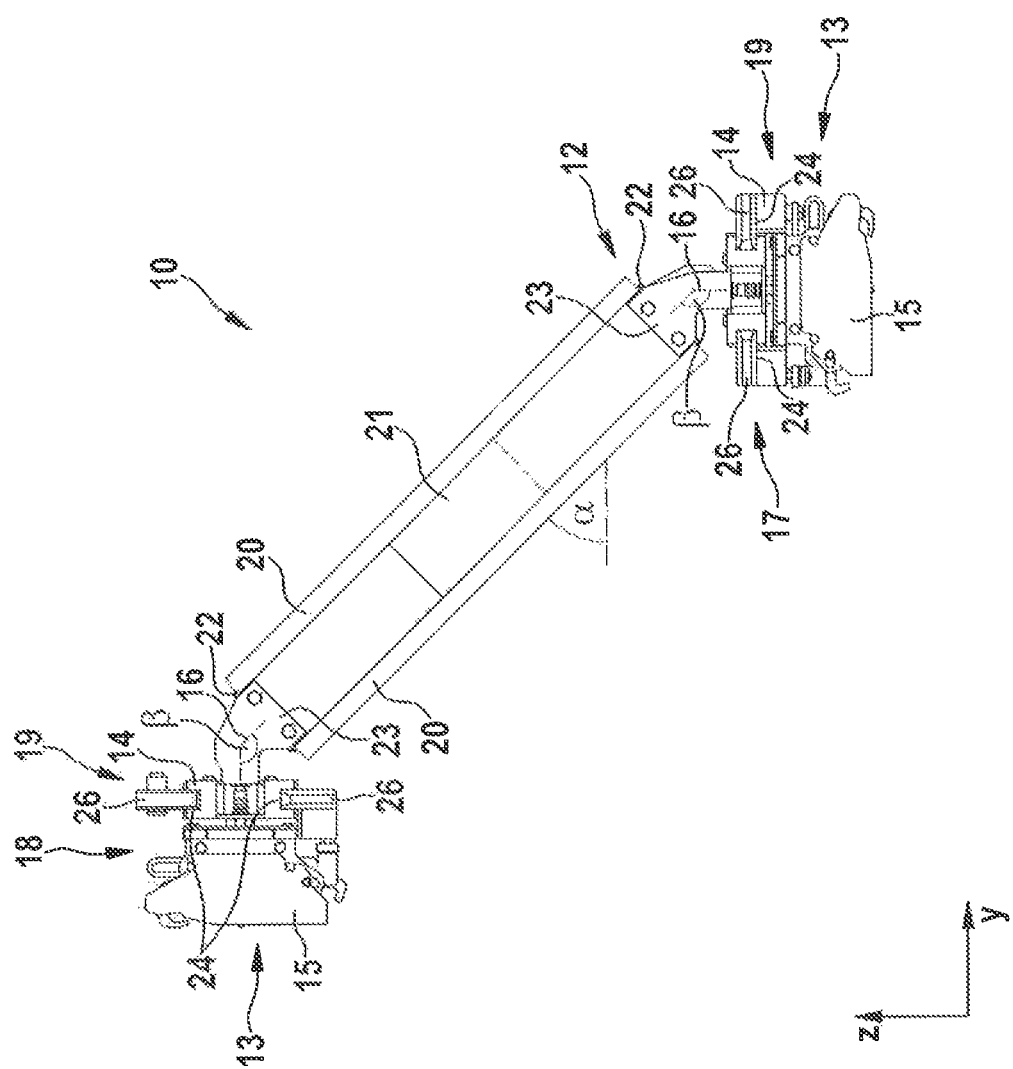
Figure 3:
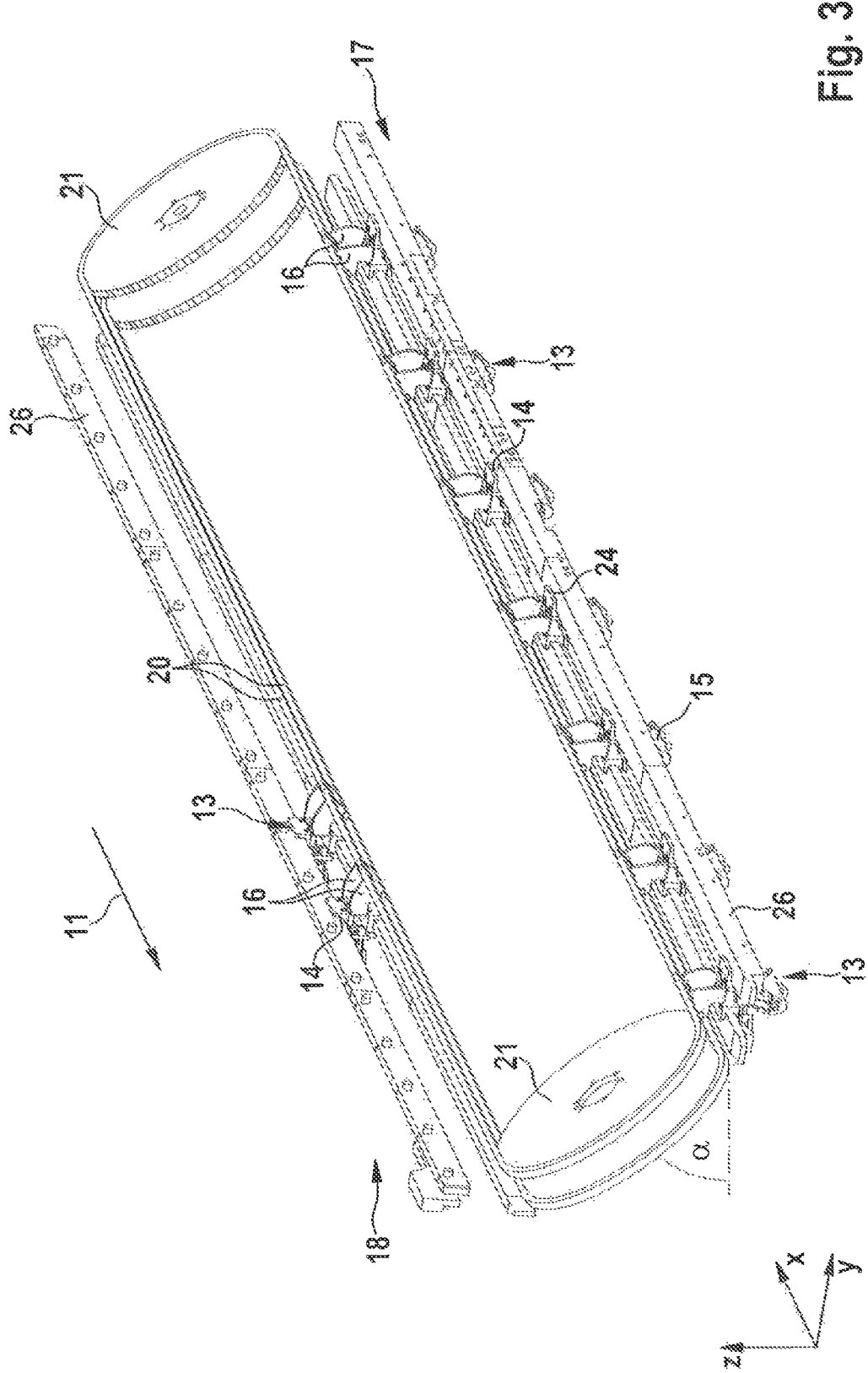
Figure 4:
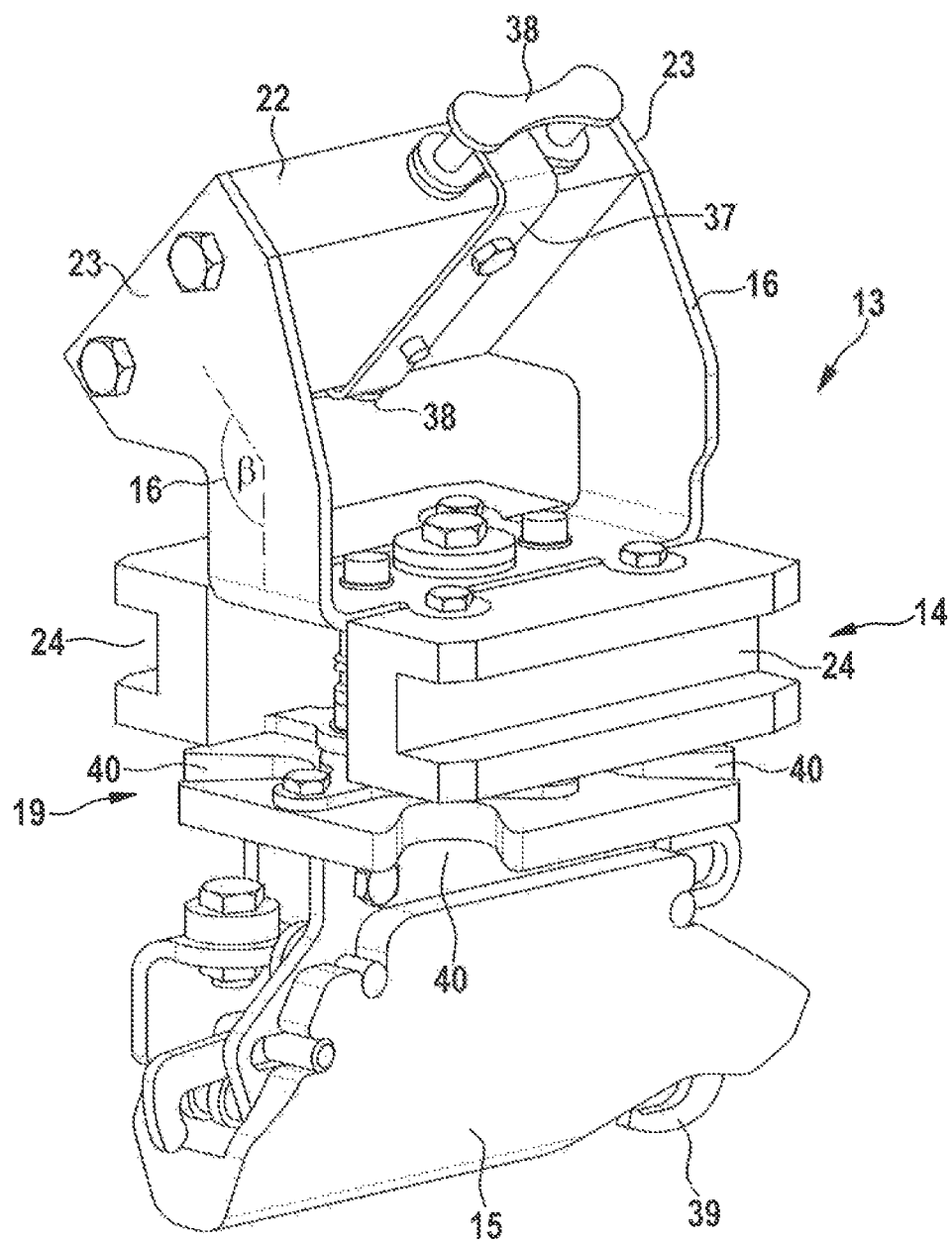
Figure 5:
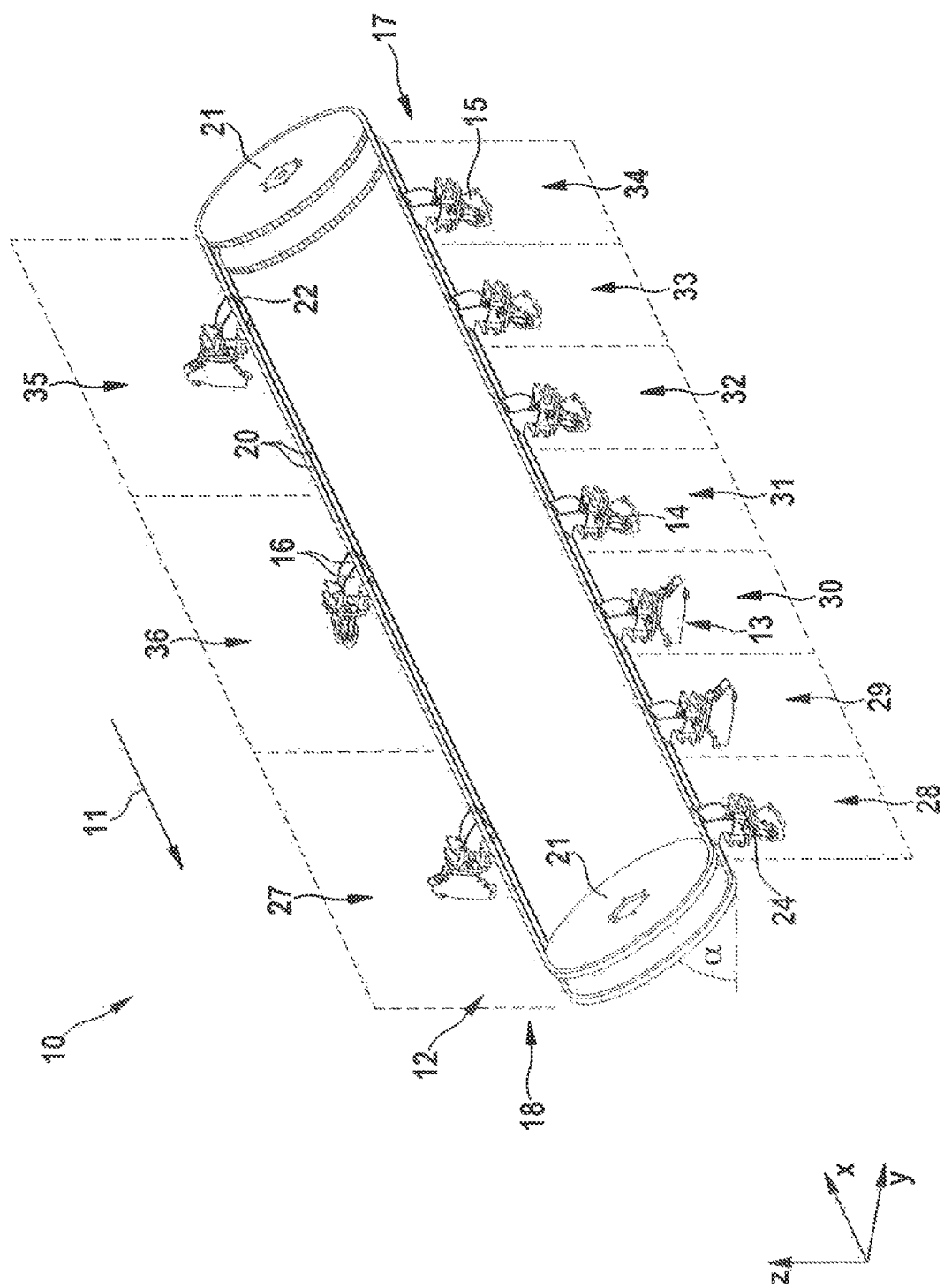

Further preferred and/or expedient features and embodiments of the invention will become apparent from the dependent claims and the description. Particularly preferred embodiments will be explained in greater detail with reference to the accompanying drawing, in which:

FIG. 1 is a schematic representation of the conveying device according to the invention in a perspective view, FIG. 2 shows the conveying device shown in FIG. 1 in a side view, FIG. 3 shows the conveying device shown in FIG. 1 with guides, FIG. 4 is a perspective view of a receiving element, and FIG. 5 is a schematic view of the apparatus according to the invention for recovering fillets from poultry bodies or parts thereof.

FIG. 1 shows the conveying device 10 according to the invention schematically in a perspective view. The conveying device 10 according to the invention is adapted to convey poultry bodies—not shown in FIG. 1—continuously in a conveying direction 11. The conveying device 10 according to the invention is further adapted to orient the poultry bodies into different processing positions. To that end, the conveying device 10 comprises a continuous conveyor 12. The continuous conveyor 12 is provided with receiving elements 13 for holding the poultry bodies. The continuous conveyor 12 is adapted to revolve in a conveying plane and thus forms a conveying path for the poultry bodies. The poultry bodies held by means of the receiving elements 13 are in this manner conveyed in a revolving manner by means of the continuous conveyor 12.

To that end, the receiving elements 13 are each adapted to receive one of the poultry bodies and comprise a base element 14 and also a saddle element 15, which is arranged on the base element 14 to be pivotable about an axis of rotation lying perpendicular to the conveying direction 11.

The continuous conveyor 12 is further arranged in an oblique position. The conveying plane of the continuous conveyor 12 is arranged inclined relative to the horizontal by an angle of inclination α in the range between 0° and 90°. The conveying plane denotes the plane in which the receiving elements 13 revolve. In addition, the base elements 14 are each arranged on the continuous conveyor 12 by means of angled elements 16 with an angle of extension β in the range between 180° and 90°.

In other words, the continuous conveyor 12 is so arranged in an oblique position that the conveying plane is inclined relative to the XY plane by the angle of inclination α. On account of this oblique position of the conveying plane of the continuous conveyor 12, the receiving elements 13 pass through a lower section 17 of the conveying path and an upper section 18 thereof.

Advantageously, the angle size of the angle of extension β is chosen to be equal to the difference of 180° and the angle of inclination α, in particular the angle of extension β has an angle size of 135° and the angle of inclination α an angle size of 45°. The last-mentioned angle sizes are shown, for example, by means of the conveying device according to the invention in FIG. 1. It is apparent from FIG. 1 that, with the mentioned choice of angle sizes, the axes of rotation of the saddle elements 15 in the region of the lower section 17 are oriented parallel to the Z axis, while the axes of rotation in the region of the upper section 18 are oriented parallel to the Y axis. In this manner, the basic orientation of the saddle elements, or the axes of rotation thereof, is changed automatically as the device revolves, so that they have correspondingly different orientations in the lower section 17 and upper section 18.

In FIG. 2, the conveying device 10 according to the invention is shown with the viewing direction at the YZ plane. The receiving elements 13 in the region of the lower section 17 of the conveying path are moving away from the observer, while the receiving elements 13 in the region of the upper section 18 are moving towards the observer. The change in orientation of the axis of rotation of the saddle elements 15, namely from an orientation parallel to the Z axis in the region of the lower section 17 to an orientation parallel to the Y axis in the region of the upper section 18, can clearly be seen.

In the exemplary embodiment shown, the poultry body parts are transported hanging downwards in the region of the lower section of the conveying path, while in the region of the upper section 18 of the conveying path they are conveyed in an upright position.

Arranged on the saddle elements 15—see FIGS. 1 and 2—are adjusting means 19 which are adapted to pivot the saddle elements 15 about their respective axis of rotation relative to the base element 14. The adjusting means 19 are in particular in the form of pivot guides, for example in the form of Maltese crosses, which are adapted to come into engagement with control means—not shown in the drawings—arranged along the conveying path. By the cooperation of the control means with the adjusting means 19 in the form of pivot guides, the saddle elements 15 along the conveying path are pivoted in each case into the desired position.

The adjusting means 19 are thus adapted, in conjunction with the control means arranged along the conveying path, to pivot the base elements 14, including the saddle elements 15, about their respective axis of rotation. In this manner, it is possible to change the orientation of the saddle elements 15 relative to the respective base elements 14 by pivoting about the axis of rotation and thus optimally orient the poultry bodies or the parts thereof for processing steps which are to be carried out.

The adjusting means 19 preferably have four recesses 40 offset in each case by 90°. The adjusting means 19 with the recesses 40 form a type of Maltese cross. The adjusting means 19 and the control means are consequently in the form of a cam control and are adapted to pivot the saddle elements 15 about the respective axis of rotation in 90° steps.

The angle of extension β of the angled elements 16 is preferably adapted to be adjustable (not shown in the drawing). In this manner, the spatial orientation of the saddle elements can be adjusted as required and adapted to the local circumstances.

Further preferably, the continuous conveyor 12 comprises two conveying chains 20 arranged parallel to one another. The conveying chains 20 are each guided via at least two double sprockets 21. The double sprockets 21 serve on the one hand as deflecting elements for guiding and deflecting the conveying chains, and on the other hand at least one of the double sprockets 21 is motor driven.

In particular, the angled elements 16 are arranged on holding devices 22, which in turn are each arranged on both of the conveying chains 20. Arranging the holding devices 22 on both sides ensures that the spatial orientation of the angled elements 16 relative to the continuous conveyor 12 is kept as constant as possible.

Advantageously, the holding devices 22 are each in plate form, and each of the base elements 14 is connected via two of the angled elements 16 to one of the holding devices 22. As is shown in FIGS. 1 and 2, the angled elements 16 are arranged at opposite end sides 23 of the holding device 22. Via the angled elements 16, in each case one of the holding devices 22 is connected to one of the base elements 14. However, the connection of the holding device 22 to the respective base element 14 can also take place by one or more of the angled elements 16.

As is shown in FIG. 3, the base elements 14 advantageously each comprise guides 24 which engage into the guiding means 26, which are located at least in part-regions along the conveying path and are adapted for engagement into the above-mentioned guides 24. Preferably, the guiding means 26 are located along the conveying path in the lower section 17 and in the upper section 18. In this manner, the base elements 14 are additionally guided in the upper section 18 and in the lower section 17, and it is ensured that the base elements 14 retain the intended orientation exactly even when external forces act on the saddle elements 15. The guides 24 and the guiding means 26 configured correspondingly thereto are preferably in the form of linear guides. For example, the guides 24 each form a channel in the form of a U-shaped profile, while the guiding means 26 are in the form of bars with a correspondingly rectangular cross-section.

FIG. 5 is a schematic view of the apparatus according to the invention for recovering fillets from poultry bodies or parts thereof. The apparatus according to the invention comprises the conveying device 10 described above as well as a plurality of processing stations, which for reasons of clarity are not shown explicitly in FIG. 5. The processing stations are each indicated by broken lines in FIG. 5, in order to make clear their position along the conveying path. The apparatus according to the invention for recovering fillets further comprises a mounting station 27, which is adapted to load the poultry bodies or the parts thereof onto the receiving elements 13 or the saddle elements 15.

The poultry bodies or parts thereof are preferably held on the saddle element 15 by clamping by means of a holding element 39 which is adapted to be controllable. The mounting station 27 is followed downstream in the conveying direction by skinning tools 28, which are adapted to remove the poultry skin. Downstream of the skinning tools 28 there are preferably arranged punching tools 29, which are adapted to remove the wishbone and/or the shoulder joints. The punching tools are followed by fillet loosening tools, which are preferably formed by measuring means 30 for determining the position of the shoulder joints, a single fillet cutter 31 adapted on the basis of the determined shoulder joint position, a first fillet scraper 32, an outer fillet loosener 33, and a second fillet scraper 34. There further follows a removal station 35, which is adapted to completely remove the fillets from the poultry carcass. The following discharge station 36 is configured and adapted to remove the fillet-free poultry carcass from the respective receiving element 13 or the saddle element 15.

As is apparent from FIG. 5, the mounting station 27, the discharge station 36 and the removal station 35 are arranged in an upper region of the conveying path, that is to say the above-mentioned stations are arranged in the region of the upper section 18. The remaining devices 28 to 34 are arranged in the lower region of the conveying path, that is to say in the region of the lower section 17. The removal station 35 is preferably adapted to completely separate the fillets manually from the poultry carcass of one of the poultry bodies. Alternatively, it is also possible that the removal station 35 comprises means for automatically removing the fillets. Such an automatic removal station 35 is preferably arranged in the region of the lower section 17.

It can be seen in FIG. 5 that the saddle elements in the upper section 18 are preferably so oriented that the axis of rotation of the saddle elements 15 is in each case oriented parallel to the Y axis. In other words, the axis of rotation of the saddle elements in the upper section 18 is oriented at least substantially horizontally. In the lower section 17, on the other hand, the axes of rotation of the saddle elements 15 are oriented parallel to the Z axis, that is to say preferably vertically. In particular the orientation shown in FIG. 5 of the saddle element 15 as it passes the removal station 35 is found to be particularly advantageous because, in the case of manual processing, the fillets are removed by a pulling movement directed groundwards.

FIG. 4 shows in detail a receiving element 13 in a perspective view. The receiving element 13 comprises a base element 14 on which two of the angled elements 16 are arranged. The angled elements 16 establish the connection to the conveying device 10—not shown in FIG. 4. The saddle element 15 is arranged on the base element 14 to be pivotable about an axis of rotation—not shown in the drawing.

The saddle elements 15 are consequently each arranged to be rotatable relative to the base element 14. The axis of rotation runs centrally through the base element 14 and is oriented vertically in FIG. 4. As the saddle elements 15 revolve by means of the conveying device 10, the orientation of the axis of rotation changes correspondingly as described above.

The saddle element 15 preferably comprises the holding element 39, which is adapted to grip the poultry body by clamping and hold it on the saddle element 15, as well as the guides 24, which are in particular in the form of recesses in the form of a U-shaped profile. Further preferably, the angled elements 16 are arranged on the end sides 23 of a holding device 22. The holding device 22 is preferably arranged by means of a holding clip 37 on chain links 38, which are only adumbrated in FIG. 5, of the conveying chains 20.

The invention claimed is:
1. A conveying device for continuously conveying poultry bodies or parts thereof in a conveying direction, configured and adapted to orient the poultry bodies into different processing positions, comprising
   a continuous conveyor provided with receiving elements for holding the poultry bodies, wherein the continuous conveyor is adapted to revolve in a conveying plane and forms a conveying path, and wherein
   the receiving elements each comprise a saddle element adapted to receive one of the poultry bodies and arranged on a base element to be pivotable about an axis of rotation lying perpendicular to the conveying direction,
   wherein
   the continuous conveyor is so arranged in an oblique position that the conveying plane is inclined relative to the horizontal by an angle of inclination $\alpha$ greater than 0° and less than 90°, and
   the base elements are each arranged on the continuous conveyor by angled elements with an angle of extension $\beta$ less than 180° and greater than 90°.

2. The conveying device according to claim 1, wherein the angle size of the angle of extension $\beta$ corresponds to the difference of 180° and the angle of inclination $\alpha$.

3. The conveying device according to claim 1, wherein the angle of extension $\beta$ has an angle size of 135° and the angle of inclination $\alpha$ has an angle size of 45°.

4. The conveying device according to claim 1, wherein the angle of extension $\beta$ of the angled elements is in each case adapted to be adjustable.

5. The conveying device according to claim 1, wherein the continuous conveyor comprises two conveying chains arranged parallel to one another, each of which is guided via at least two double sprockets.

6. The conveying device according to claim 5, wherein the angled elements are arranged on holding devices which in each case are arranged on both of the conveying chains.

7. The conveying device according to claim 6, wherein the holding devices are each in plate form, and each of the base elements is connected via two each of the angled elements to one of the holding devices.

8. The conveying device according to claim 1, wherein the base elements each comprise guides, and guiding elements adapted for engagement into the guides are located at least in part-regions along the conveying path.

9. The conveying device according to claim 1, wherein adjusting elements are arranged on the saddle elements, which adjusting elements are adapted, in conjunction with control elements arranged along the conveying path, to pivot the saddle elements about the axis of rotation.

10. The conveying device according to claim 9, wherein the adjusting elements and the control elements are each in the form of a cam control which is adapted to pivot the saddle elements about the axis of rotation in each case in 90° steps.

11. An apparatus for recovering fillets from poultry bodies or parts thereof, comprising a conveying device according to claim 1 as well as at least one mounting station arranged along the conveying path and adapted for loading the poultry bodies onto receiving elements, skinning tools and also fillet loosening tools, a removal station for completely removing the fillets from the poultry carcass, and a discharge station for removing the fillet-free poultry carcass from the respective receiving element, wherein the mounting station, the discharge station and the removal station are arranged in an upper region of the conveying path, while the skinning tools and the fillet loosening tools are arranged in a lower region of the conveying path.

12. The apparatus according to claim 11, further comprising at least one measuring element adapted for determining the shoulder joint position, and also a control device which is configured to control the fillet loosening tools in dependence on the determined shoulder joint position.

13. A method for continuously conveying poultry bodies or parts thereof and for orienting them into different processing positions, comprising conveying the poultry bodies in a conveying direction by a continuous conveyor provided with receiving elements for holding the poultry bodies, wherein the continuous conveyor forms a conveying path and revolves in a conveying plane, and wherein the receiving elements each comprise a saddle element which is adapted to receive one of the poultry bodies and is arranged on the base element to be pivotable about an axis of rotation lying perpendicular to the conveying direction,
wherein
the continuous conveyor revolves in a conveying plane which is inclined relative to the horizontal by an angle of inclination $\alpha$ greater than 0° and less than 90°, and the base elements are each arranged on the continuous conveyor by angled elements with an angle of extension $\beta$ less than 180° and greater than 90°.

14. The method according to claim 13, wherein the angle size of the angle of extension $\beta$ corresponds to the difference of 180° and the angle of inclination $\alpha$.

15. The method according to claim 13, wherein at the angle of extension $\beta$ has an angle size of 135° and the angle of inclination $\alpha$ has an angle size of 45°.

16. The method according to claim 13, wherein the angle of extension $\beta$ of each of the angled elements is adjustable.

17. The method according to claim 13, further comprising guiding of the base elements by guides into which there engage guiding elements arranged at least in part-regions along the conveying path.

18. The method according to claim 13, further comprising pivoting of the saddle elements about the axis of rotation by adjusting elements arranged on the saddle elements by cooperation with control elements arranged along the conveying path.

19. The method according to claim 18, further comprising stepwise pivoting of the saddle elements in 90° steps by the adjusting elements each in the form of a cam control.

20. The method for recovering fillets from poultry bodies or parts thereof, comprising a method for continuously conveying poultry bodies and for orienting them into different processing positions according to claim 13, further comprising:
loading the poultry bodies onto the receiving elements at a mounting station,
skinning the poultry bodies by skinning tools,
loosening the fillets by fillet loosening tools,
completely removing the fillets from the poultry carcass at a removal station, and
removing the fillet-free poultry carcass from the respective receiving element by a discharge station,
wherein loading by the mounting station, removal of the fillet-free poultry carcass by the discharge station and complete removal of the fillets by the removal station take place in an upper region of the conveying path, while skinning by the skinning tools and loosening of the fillets by the fillet loosening tools are carried out in a lower region of the conveying path.

21. The method according to claim 20, further comprising determining the shoulder joint position by at least one measuring element and controlling the fillet loosening tools by a control device in dependence on the determined shoulder joint position.

\* \* \* \* \*